US012779392B2

(12) United States Patent
Nauert et al.

(10) Patent No.: US 12,779,392 B2
(45) Date of Patent: Nov. 3, 2026

(54) SOLVENT-BASED $CO_2$ CAPTURE PROCESS INCORPORATING A HEAT PUMP

(71) Applicant: UOP LLC, Des Plaines, IL (US)

(72) Inventors: Scott L Nauert, Chicago, IL (US); David Farr, Claremore, OK (US); Glen Pomorski, Park Ridge, IL (US)

(73) Assignee: UOP LLC, Des Plaines, IL (US)

( * ) Notice: Subject to any disclaimer, the term of this patent is extended or adjusted under 35 U.S.C. 154(b) by 370 days.

(21) Appl. No.: 18/512,247

(22) Filed: Nov. 17, 2023

(65) Prior Publication Data

US 2024/0278168 A1 Aug. 22, 2024

Related U.S. Application Data

(60) Provisional application No. 63/485,683, filed on Feb. 17, 2023.

(51) Int. Cl.
*B01D 53/14* (2006.01)
*B01D 53/34* (2006.01)
*F25B 30/02* (2006.01)

(52) U.S. Cl.
CPC .......... *B01D 53/1475* (2013.01); *F25B 30/02* (2013.01)

(58) Field of Classification Search
CPC ................ B01D 53/1475; B01D 53/14; B01D 53/1425; B01D 2257/504; B01D 2258/0283; F25B 30/02; F25B 1/10; F25B 5/02; F25B 40/00; F25B 41/39; F25B 2400/13; F25B 2400/23; Y02B 30/52
USPC .... 96/243; 95/149, 156, 159, 187, 191, 227, 95/228, 229, 236; 423/220, 228, 229
See application file for complete search history.

(56) References Cited

U.S. PATENT DOCUMENTS

| | | | |
|---|---|---|---|
| 7,976,803 | B2 | 7/2011 | Hooper et al. |
| 8,388,919 | B2 | 3/2013 | Hooper et al. |
| 9,492,783 | B2 | 11/2016 | Tsutsumi et al. |
| 9,956,505 | B2 | 5/2018 | Rochelle et al. |

(Continued)

FOREIGN PATENT DOCUMENTS

| | | | |
|---|---|---|---|
| CN | 105126586 | A | 12/2015 |
| CN | 114682042 | A | 7/2022 |

(Continued)

OTHER PUBLICATIONS

Machine-generated English translation of JP 2023-162661 A, published Nov. 9, 2023.*

(Continued)

*Primary Examiner* — Frank M Lawrence, Jr.

(57) ABSTRACT

Processes for $CO_2$ recovery from flue gas are described. The processes involve the use of a vapor compression heat pump cycle. The heat pump comprises an evaporator, a heat pump compressor, a condenser, and a pressure letdown device. The condenser is a heat exchanger exchanging heat from a working fluid to a $CO_2$ containing solvent in which $CO_2$ is released, and the evaporator is a heat exchanger exchanging heat from a suitable low temperature heat source to the working fluid. The condenser of the heat pump replaces the steam heater for the stripping column, and the evaporator replaces a heat exchanger, such as the quench cooler.

16 Claims, 9 Drawing Sheets

(56) References Cited

U.S. PATENT DOCUMENTS

| | | | | |
|---|---|---|---|---|
| 2009/0151566 | A1 | 6/2009 | Handagama et al. | |
| 2010/0104490 | A1 | 4/2010 | Bouillon et al. | |
| 2011/0195004 | A1 | 8/2011 | Warner | |
| 2014/0196499 | A1 * | 7/2014 | Dube | B01D 53/1425 62/617 |
| 2015/0246298 | A1 | 9/2015 | Rochelle et al. | |
| 2019/0233296 | A1 * | 8/2019 | Novek | B01D 61/029 |
| 2020/0188840 | A1 * | 6/2020 | Novek | B01D 53/263 |
| 2021/0079823 | A1 * | 3/2021 | Tsujiuchi | F01K 17/02 |
| 2023/0149852 | A1 * | 5/2023 | Umeda | C01B 32/50 423/220 |
| 2024/0307820 | A1 * | 9/2024 | Nauert | B01D 53/343 |
| 2025/0256238 | A1 * | 8/2025 | Matsuo | B01D 53/18 |

FOREIGN PATENT DOCUMENTS

| | | | | |
|---|---|---|---|---|
| CN | 115263466 A | | 11/2022 | |
| CN | 115654760 A | | 1/2023 | |
| JP | 2023162661 A | * | 11/2023 | B01D 53/18 |
| WO | 2007012143 A1 | | 2/2007 | |
| WO | 2011073672 A1 | | 6/2011 | |
| WO | 2022094605 A1 | | 5/2022 | |

OTHER PUBLICATIONS

Yann Le Moullec et al., Process modifications for solvent-based post-combustion CO2 capture, International Journal of Greenhouse Gas Control 31 (2014), 96-112.

Yu-Jeng Lin et al., Optimization of Advanced Flash Stripper for CO2 Capture using Piperazine, Energy Procedia 63 (2014), 1504-1513.

Rafiaani , Identifying social indicators for sustainability assessment of CCU technologics: a modified multi-criteria decision making, Social Indicators Research Open Access vol. 147, Issue 1, pp. 15-44, @ 2019 https://documentserver.uhasselt.be/bitstream/1942/28658/1/Rafiaani%20et%20al.%202019-Author%20version.pdf.

Rosa M. Cuéllar-Franca et al., Carbon capture, storage and utilisation technologies: A critical analysis and comparison of their lief cycle environmental impacts, Journal of CO2 Utilization 9 (2015) 82-102.

Paul E. Hardisty et al., The Environmental and Economic Sustainability of Carbon Capture and Storage, International Journal of Environmental Research and Public Health, 2011, 8, 1460-1477, ISSN 1660-4601, www.mdpi.com/journal/ijerph.

International Search Report from corresponding PCT application No. PCT/US2024/015304, dated Jun. 13, 2024.

Written Opinion from corresponding PCT application No. PCT/US2024/015304, dated Jun. 13, 2024.

* cited by examiner

SOLVENT-BASED $CO_2$ CAPTURE PROCESS INCORPORATING A HEAT PUMP

RELATED APPLICATIONS

This application claims priority to U.S. Provisional Patent Application Ser. No. 63/485,683, filed on Feb. 17, 2023, the entirety of which is incorporated herein by reference.

BACKGROUND

Field of the Invention

Environmental concerns have led to efforts to reduce the amount of $CO_2$ released from major $CO_2$ sources such as power plants, refineries, and others industrial processes. The goal of these processes is to reduce customer $CO_2$ emissions through carbon capture and utilization or storage (CCUS).

Among the processes used for post-combustion $CO_2$ capture are solvent-based $CO_2$ absorption processes to remove $CO_2$ from flue gas streams. There are a variety of solvent-based absorption processes. In general, the flue gas is contacted with a solvent which removes the $CO_2$ from the flue gas stream, with the purified flue gas exiting from the top of the absorber column and the rich solvent stream exiting at or near the bottom of the absorber column. The rich solvent stream is sent to a stripping column where heat is input to remove the $CO_2$ from the solvent, forming an overhead $CO_2$ stream and a lean solvent stream. The overhead $CO_2$ stream can be further processed to remove impurities.

Some of the heat vaporizes water from the solvent, and the heat used to vaporize water is not productive. It would be desirable to recover the heat from the stripping column overhead stream to reduce the column reboiler or other heat duty.

In a process using a simple stripping column, an overhead condenser condenses the vaporized water and returns it to the stripping column as reflux. This process loses all heat from the vaporized water. Another process involves the use of a flash stripper, as described in U.S. Pat. No. 9,956,505, which is incorporated herein by reference in its entirety. This process does not use a stripper reboiler. Instead, the heat is supplied by a heater, such as a convective steam heater, upstream of the stripping column. The overhead $CO_2$ stream is heat exchanged with the rich solvent stream from the absorber, condensed to remove water, and compressed. Some waste heat (e.g., about 40-50% of the water latent heat of vaporization) is recovered in the rich solvent heat exchanger. The rest of the heat is lost because the temperature at which the heat is available drops below the process pinch point temperature at which point it is no longer useful.

One challenge with both the simple stripping process and the flash stripping process is that they require process heat in the stripping column reboiler or stripping column steam heater to remove $CO_2$ from the solvent. This process heat is typically provided by steam which is generated by burning natural gas or coal in a power plant or by burning natural gas in a separate boiler. In the case of the flash stripping process with steam generated by burning natural gas in a separate boiler, this produces between 0.15-0.2 kg $CO_2$ per kg $CO_2$ captured from the feed. $CO_2$ from the boiler can be captured in the process, but this increases the overall size of the plant and increases transport and storage costs. Additionally, it may not be desirable in some situations to generate additional $CO_2$ in the process of capturing $CO_2$ from the feed source.

Another issue involves the necessity of large amounts of cooling water for the process. Fresh water is becoming a very precious resource. Because the process temperatures needed are lower than can be reasonably achieved with air cooling, cooling water is required. Flash stripping requires a large amount of process cooling (e.g., on the order of 500 MMBTU/h cooling to capture 1 million MT $CO_2$/yr from an FCC unit). Providing this amount of cooling water may be difficult in locations where there is a current or potential future restriction on the availability of water.

Therefore, there is a need for a carbon capture process having a lower heat input requirement and/or a reduced cooling water requirement.

DESCRIPTION OF THE INVENTION

Figure 1:
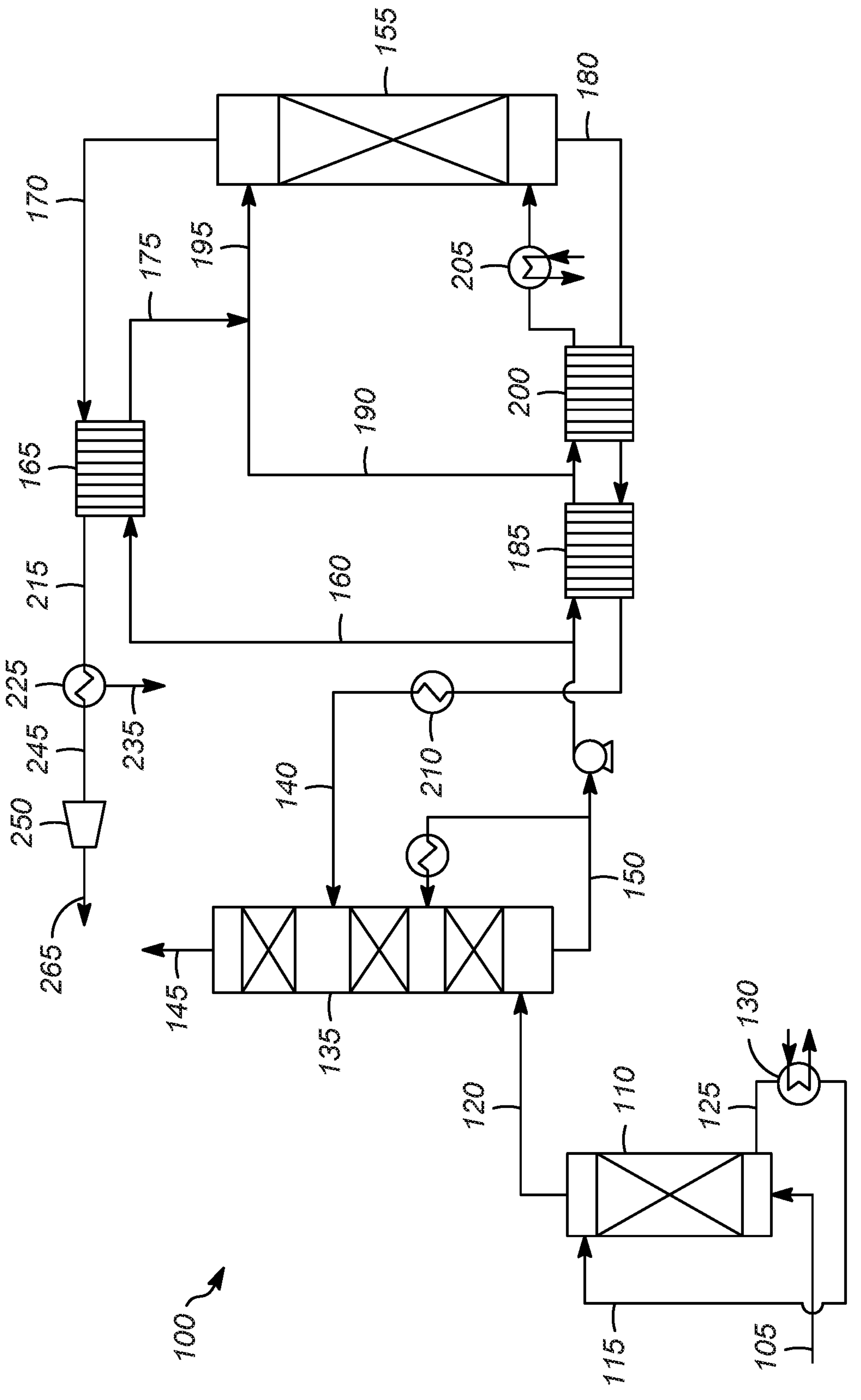
(Prior Art) FIG. 1
FIG. 1 is an illustration of an existing flash stripping process.

The present invention solves these problems by replacing process heat duty with an all-electric solution in a thermodynamically efficient manner. Heat is transferred from a low temperature heat source in the process to the steam heater through the use of a one- or two-stage heat pump system described below. This achieves two purposes. First, the steam heater heat duty is replaced by electricity duty from the heat pump compressor. This eliminates 0.15-0.20 kg $CO_2$ per kg $CO_2$ captured that would have been produced in the steam boiler to provide heat for the steam heater. In situations where the plant would otherwise capture the parasitic $CO_2$ emissions from the steam boiler, this reduces the overall size of the unit by 13-17%, thereby reducing both the capital expenses (capex) and the operating expenses (opex) of the larger complex. Cooling water duty is also reduced by approximately 30% by replacing a portion of the process cooling duty with the low temperature heat source required for the heat pump.

The coefficient of performance (COP) is one metric for evaluating the performance of a heat pump. The COP is defined as the ratio of heat duty from the high temperature source (steam heater) to the work (compressor power) required for the heat pump. Higher COP indicates that less electricity is required to replace a given amount of heat. Depending on the particular heat pump configuration, working fluid, process waste heat temperature, and steam heater temperature, the COP can be up to 2.0 (e.g., in 1-stage heat pump using isopentane), 2.5 (e.g., in a 2-stage heat pump using isopentane), or 3.0 (e.g., in a 2-stage heat pump using methyl formate). Reducing the cooling water requirement may add additional opex savings. This cost advantage is in addition to the environmental benefits. The heat pump system will add capital cost for the heat pump compressor, but this is weighed against a smaller unit size due to avoiding having to capture the natural gas boiler emissions.

In the flash stripping process, the steam heater is a two-phase forced convection exchanger in which both liquid and gas may be in contact with the steam heat source, and these sections have very different heat transfer coefficients. This is incompatible with current electric heater designs which provide constant heat flux. The problem is that with constant heat flux, the heating element temperature depends on the heat transfer coefficient. For two phase flow, the heat transfer coefficient may change by over an order of magnitude from liquid to gas sections. This creates extreme hot spots on the heating element which can cause the element to melt or otherwise catastrophically fail.

The process involves the use of a vapor compression heat pump cycle. The heat pump comprises an evaporator, a heat pump compressor, a condenser, and a pressure letdown device. The condenser is a heat exchanger exchanging heat from a working fluid to a $CO_2$ containing solvent in which $CO_2$ is released, and the evaporator is a heat exchanger exchanging heat from a suitable low temperature heat source to the working fluid.

In some embodiments, the low temperature heat source is a process stream from the $CO_2$ capture facility. In some embodiments, the low temperature heat source comprises a stream from a feed quench cooler, a stream from an absorber cooler, a stream from a lean solvent cooler, a stream from an overhead vapor condenser, a stream from a $CO_2$ compressor intercooler, a flue gas stream from a flue gas economizer, or combinations thereof from the $CO_2$ capture facility. The term flue gas economizer means that the economizer is placed on the flue gas stream that enters the absorber. The flue gas economizer is also referred to as a boiler economizer, a feedwater economizer, or an exhaust gas economizer by different entities.

In some embodiments, the heat pump can be a single stage heat pump or a two-stage heat pump. In some embodiments, the single stage heat pump and the two-stage heat pump can include an internal heat exchanger. In some embodiments where there is a single stage heat pump with an internal heat exchanger, the internal heat exchanger can be located in parallel with the evaporator. In some embodiments, the heat pump may comprise a two-stage heat pump with a vapor/liquid separator in which the vapor is mixed with the first stage compressor effluent and directed to the second stage compressor suction. In some embodiments, the heat pump may comprise a two-stage heat pump with a vapor/liquid separator in which a portion of the liquid is vaporized in a heat exchanger, combined with vapor from the first stage compressor effluent, and directed to the second stage compressor suction.

In some embodiments, the heat pump (both single stage and two-stage) also includes an internal heat exchanger exchanging heat between the evaporator effluent and the condenser effluent. In some embodiments, the internal heat exchanger instead exchanges heat between the evaporator effluent and a stream located directly after a pressure letdown device. In these embodiments, the internal heat exchanger is placed in parallel with the evaporator, and the internal heat exchanger effluent and evaporator effluent are combined before the compressor suction. These embodiments may be needed in some cases to prevent two-phase flow in the compressor when the working fluid is classified as a thermodynamic “dry fluid,” and it typically applies to hydrocarbons such as butanes and pentanes. Two-phase flow in the compressor would destroy the compressor. An internal heat exchanger may not be needed for fluids classified as “isentropic” or “wet” because two-phase flow is not likely to be achieved in the compressor for these fluids.

In some embodiments, the evaporator comprises at least two heat exchangers in parallel. The working fluid is split upstream of the evaporator heat exchangers, heated in one or more of the evaporator heat exchangers, and combined downstream to form a single heated working fluid stream. One or more of the evaporator heat exchangers involves contacting a process stream having waste heat with the working fluid stream forming a cooled process stream and a first heated working fluid stream. A final evaporator heat exchanger involves contacting the working fluid stream with a suitable heating medium forming a first working fluid stream. Suitable heating media include steam, hot oil, an electric heating element, or a process stream with temperature greater than about 100° C. Working fluid flow through this final evaporator heat exchanger may be continuous or intermittent. The final evaporator heat exchanger provides a way to vaporize the working fluid using a heat source not coupled to the rest of the process. This can be beneficial during startup to vaporize the feed or during normal operations to provide additional heat to the heat pump system.

In some embodiments, the working fluid has a critical temperature 150° C. or greater and a normal boiling point 50° C. or less at 100 kPa. In some embodiments, the working fluid has a critical temperature 160° C. or greater and a normal boiling point 40° C. or less at 100 kPa.

In some embodiments, the working fluid comprises a chlorofluorocarbon, a hydrochlorofluorcarbon, a hydrofluorocarbon, a hydrofluoroolefin, a hydrochlorofluoroolefin, a hydrocarbon, an oxygenate, or combinations thereof. Suitable working fluids include, but are not limited to, trans-1-chloro-3,3,3-cis-1-chloro-3,3,3-trifluoropropene, trans-1-chloro-2,3,3,3-trifluoropropene, tetrafluoropropene, cis-1,1,1,4,4,4-hexafluoro-2-butene, n-butane, isobutane, n-pentane, isopentane, neopentane, cyclohexane, diethyl ether, methyl formate, ethylamine, a hydrochlorofluoroolefin having 3 carbon atoms, a hydrofluoroolefin having 4 carbon atoms, or combinations thereof.

Selection of an appropriate working fluid can be made by considering a number of factors, including, but not limited to, COP, toxicity, cost, and flammability. For example, isopentane is inexpensive and has low toxicity, but it has a lower COP than methyl formate. Methyl formate has a higher COP than isopentane, but it has toxicity concerns. C3 hydrochlorofluoroolefins and C4 hydrofluoroolefins are non-toxic, have low flammability, and have higher performance than hydrocarbons like isopentane, but they are more expensive than isopentane or methyl formate.

In some embodiments, the pressure letdown device is a valve. In other embodiments, the pressure letdown device is a pressure recovery turbine. The pressure recovery turbine adds capital cost, but reduces entropic losses when expanding a fluid compared to a valve. A pressure recovery turbine may be desirable for a single stage system, while letdown valves may be desirable for two-stage systems.

In one embodiment, a process stream having waste heat (e.g., a temperature below the process pinch temperature, typically a temperature of 110° C. or less) is contacted with the working fluid stream in the evaporator. The working fluid is heated while the process stream is cooled. In one embodiment, the waste heat temperature is 70° C. or less.

The flue gas stream and a lean solvent stream are introduced into the absorber column where the $CO_2$ is absorbed into an absorbent. Any suitable absorbent can be used as is known in the art. Suitable absorbents include, but are not limited to potassium carbonate, monoethanolamine, diethanolamine, methyldiethanolamine, piperazine, 2-methylpiperazine, amino-2-methyl-1-propanol, or combinations thereof.

The purified flue gas stream exits at the top of the absorber column and the rich solvent stream exits from the bottom. A "rich solvent" stream is any stream that contains more $CO_2$ than the "lean solvent" stream from the stripping column.

The rich solvent stream from the absorber or a second solvent stream from the stripping column or both are contacted with the compressed working fluid stream in the condenser of the heat pump forming a heated rich solvent stream or a heated second solvent stream or both and the cooled working fluid stream.

The heated rich solvent stream or the heated second solvent stream or both are sent to the stripping column where the $CO_2$ is separated from the solvent. The heated rich solvent stream or the heated second solvent stream or both are delivered to the stripping column at a point below the lowest tray or section of packing. The $CO_2$ exits in an overhead stream, and the lean solvent exits at or near the bottom of the stripping column. The lean solvent stream is returned to the absorber column.

In some embodiments, the flue gas stream is sent to a feed quench cooler for cooling before entering the absorber column. The flue gas stream is contacted with a quench stream in a quench column forming a cooled flue gas stream and a heated quench stream. The working fluid stream is contacted with the heated quench stream in the evaporator to form the quench stream. The cooled flue gas stream is sent to the absorber column.

In some embodiments, the rich solvent stream from the absorber is preheated by heat exchange with the lean solvent stream coming from the stripping column before contacting the heated rich solvent stream with the compressed working fluid stream. There can be one or more heat exchangers.

In some embodiments, there is a first flow path delivering at least some of the rich solvent from the absorber to the point below the lowest tray or section of packing in the stripping column. There is a second flow path delivering the lean solvent from the stripping column to a point on the absorber column. There are at least a first heat exchanger and a second heat exchanger connecting the first flow path to the second flow path, with the first and second heat exchangers permitting heat transfer between the rich solvent and the lean solvent. A cold rich solvent bypass connects the first flow path at a location upstream of the first heat exchanger to a first point on the stripping column, wherein the cold rich solvent bypass directs a first portion of the rich solvent from the first flow path. A warm rich solvent bypass connects the first flow path at a location downstream of the first heat exchanger to a second point on the stripping column, wherein the warm rich solvent bypass directs a second portion of the rich solvent from the first flow path. The first and second points can be the same point on the stripping column, or they can be different points.

FIG. 1 illustrates one embodiment of a $CO_2$ capture process 100 using a flash stripping column.

The flue gas stream 105, which contains $CO_2$, is sent to a quench column 110 where it is contacted with a quench stream 115 forming a cooled flue gas stream 120 and a heated quench stream 125.

The heated quench stream 125 is sent to a heat exchanger 130 to reduce the temperature and form the quench stream 115.

The cooled flue gas stream 120 is sent to the absorber column 135 where it contacts the lean solvent stream 140. The $CO_2$ is transferred from the flue gas to the lean solvent, forming a purified flue gas stream 145 and a rich solvent stream 150. The rich solvent stream 150 is sent to the stripping column 155.

A first portion 160 of the rich solvent stream 150 is sent to a first heat exchanger 165 to exchange heat with the overhead stream 170 from the stripping column 155. The heated first portion 175 is sent to a first point on the stripping column 155.

The remainder of the rich solvent stream 150 exchanges heat with the lean solvent stream 180 in the cold heat exchanger 185 partially heating the rich solvent stream 150 and cooling the lean solvent stream 180.

A second portion 190 is taken from the rich solvent stream 150 after the cold heat exchanger 185 and combined with the heated first portion 175 and the combined stream 195 is sent to the stripping column 155.

The rest of the rich solvent stream 150 is sent to a hot heat exchanger 200 further heating the rich solvent stream 150 and cooling the lean solvent stream 180.

The further heated rich solvent stream 150 is sent to a steam heat reboiler 205 for additional heating before being introduced into the stripping column 155 at a point below the lowest tray or section of packing.

$CO_2$ is stripped from the rich solvent stream 150 in the stripping column 155, forming the overhead stream 170 comprising the $CO_2$ and the lean solvent stream 180.

After passing through the hot heat exchanger 200 and the cold heat exchanger 185, the lean solvent stream 180 is sent through a lean solvent cooler 210 forming the lean solvent stream 140. Lean solvent stream 140 is returned to the absorber column 135.

Following the first heat exchanger 165, the overhead stream 215 is sent to an overhead vapor condenser 225 forming vapor stream 245 comprising $CO_2$ and liquid stream 235 comprising water.

The stream 245 from the overhead vapor condenser 225 is sent to compressor 250 forming a product stream 265 comprising $CO_2$ which can be recovered.

Figure 2:
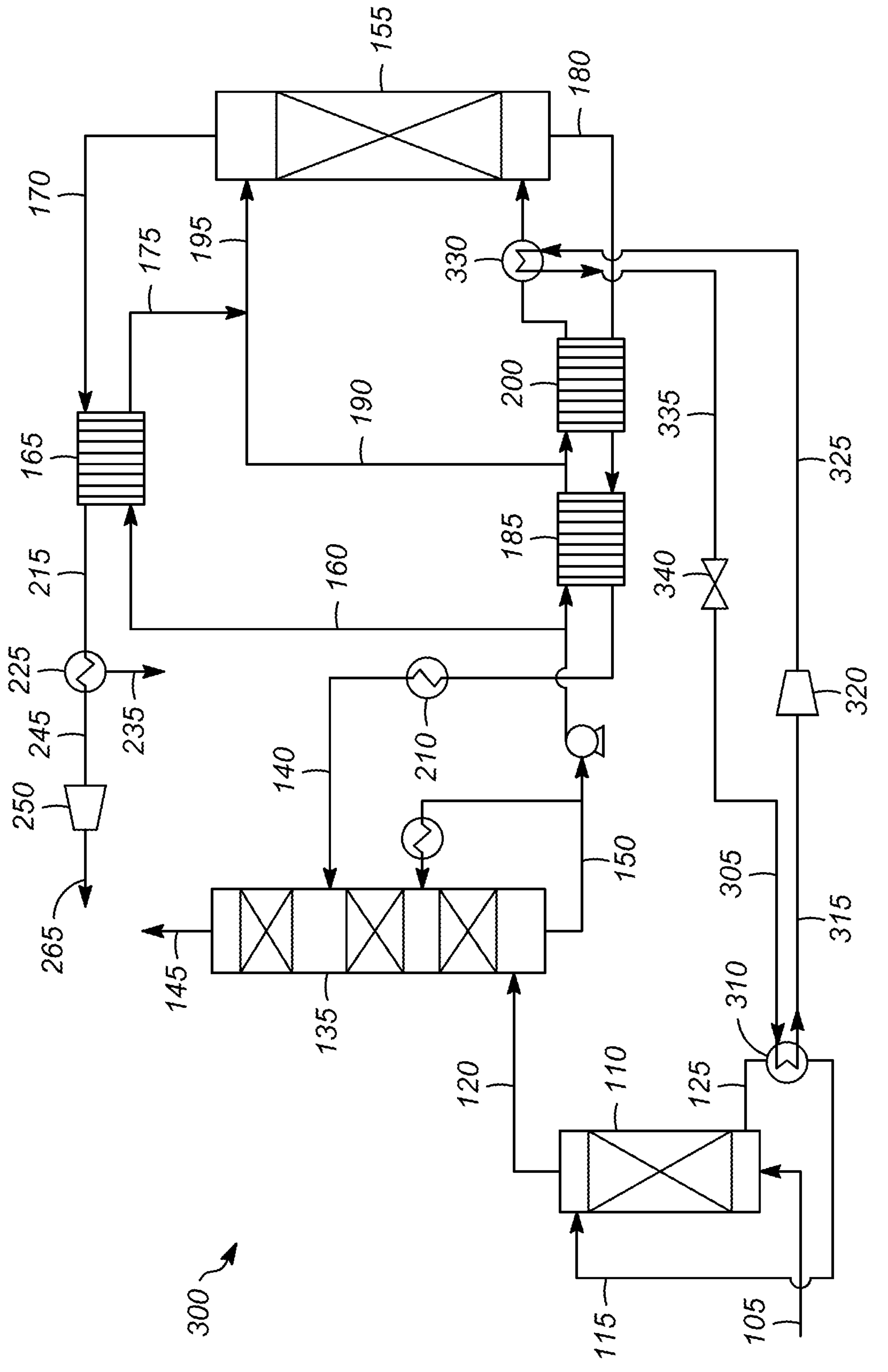
FIG. 2 is an illustration of a flash stripping process according to the present invention.

In the process 300 illustrated in FIG. 2, the feed quench cooler and the steam heater reboiler are replaced with a heat pump. The heated quench stream 125 contacts the working fluid stream 305 in the evaporator 310 forming a heated working fluid stream 315 and the quench stream 115. The heated working fluid stream 315 is compressed in heat pump compressor 320 forming compressed working fluid stream 325. The compressed working fluid stream 325 is contacted with the rich solvent stream 150 in the condenser 330 which further heats the rich solvent stream 150 and cools the compressed working fluid stream 325. The cooled compressed working fluid stream 335 is expanded in the pressure let down device 340 forming the working fluid stream 305.

Figure 3A:
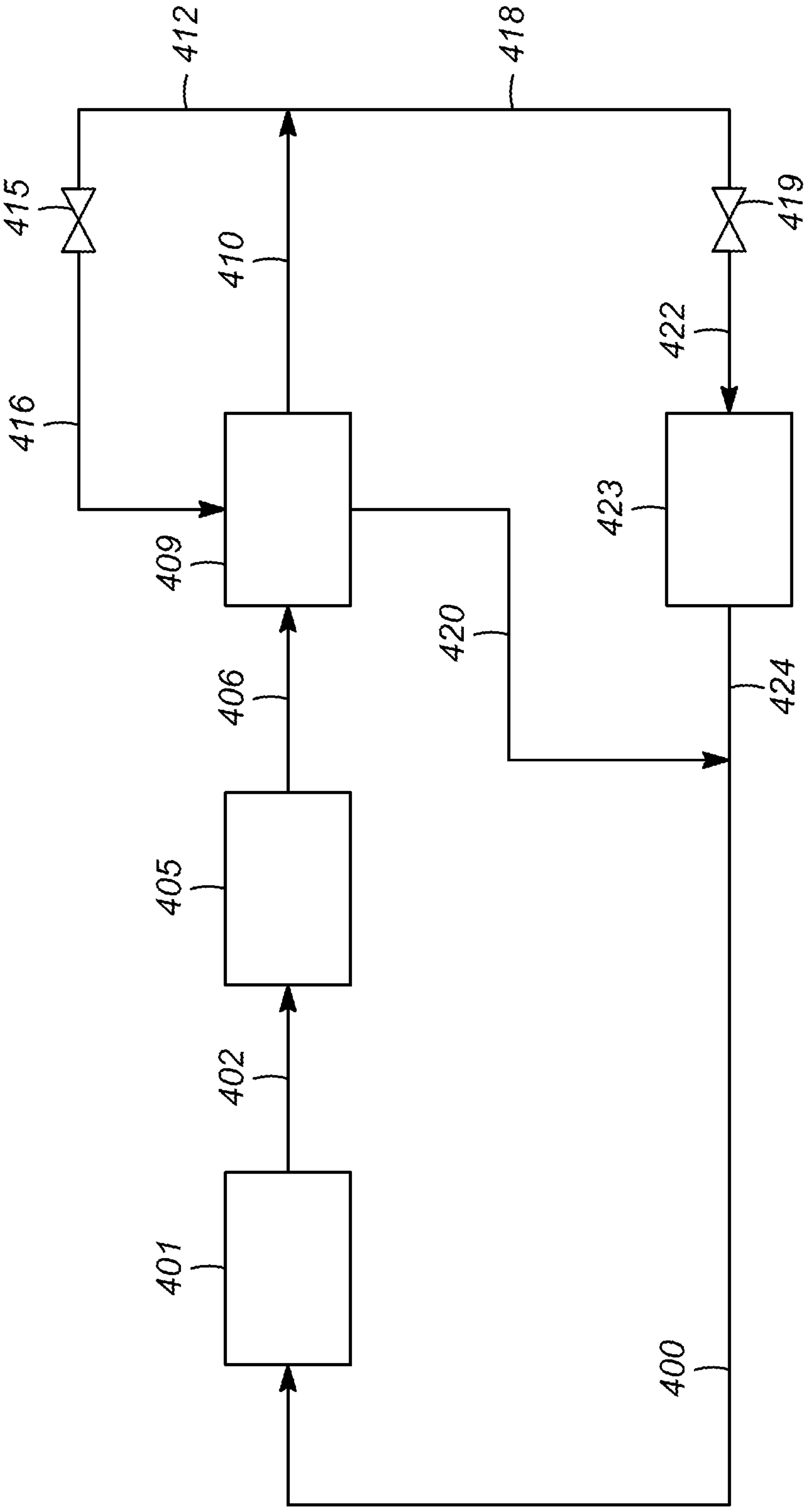
FIG. 3A is an illustration of one embodiment of a single stage heat pump with a parallel internal heat exchanger.

FIG. 3A illustrates one embodiment of a one stage heat pump described in this invention. The heated working fluid stream 400 is sent to the compressor 401 forming a compressed stream 402. Compressed stream 402 is sent to the condenser 405 followed by internal heat exchanger 409. After the internal heat exchanger 409, the cooled high pressure stream is split into streams 412 and 418. Stream 412 is sent to a pressure letdown device 415 forming stream 416 followed by the internal heat exchanger 409 where it is heated to form stream 420. Stream 418 is sent to a pressure letdown device 419 forming stream 422 followed by an evaporator 423 where it is heated to form stream 424. The heated working fluid streams 420 and 424 are combined to reform the heated working fluid stream 400.

Figure 3B:
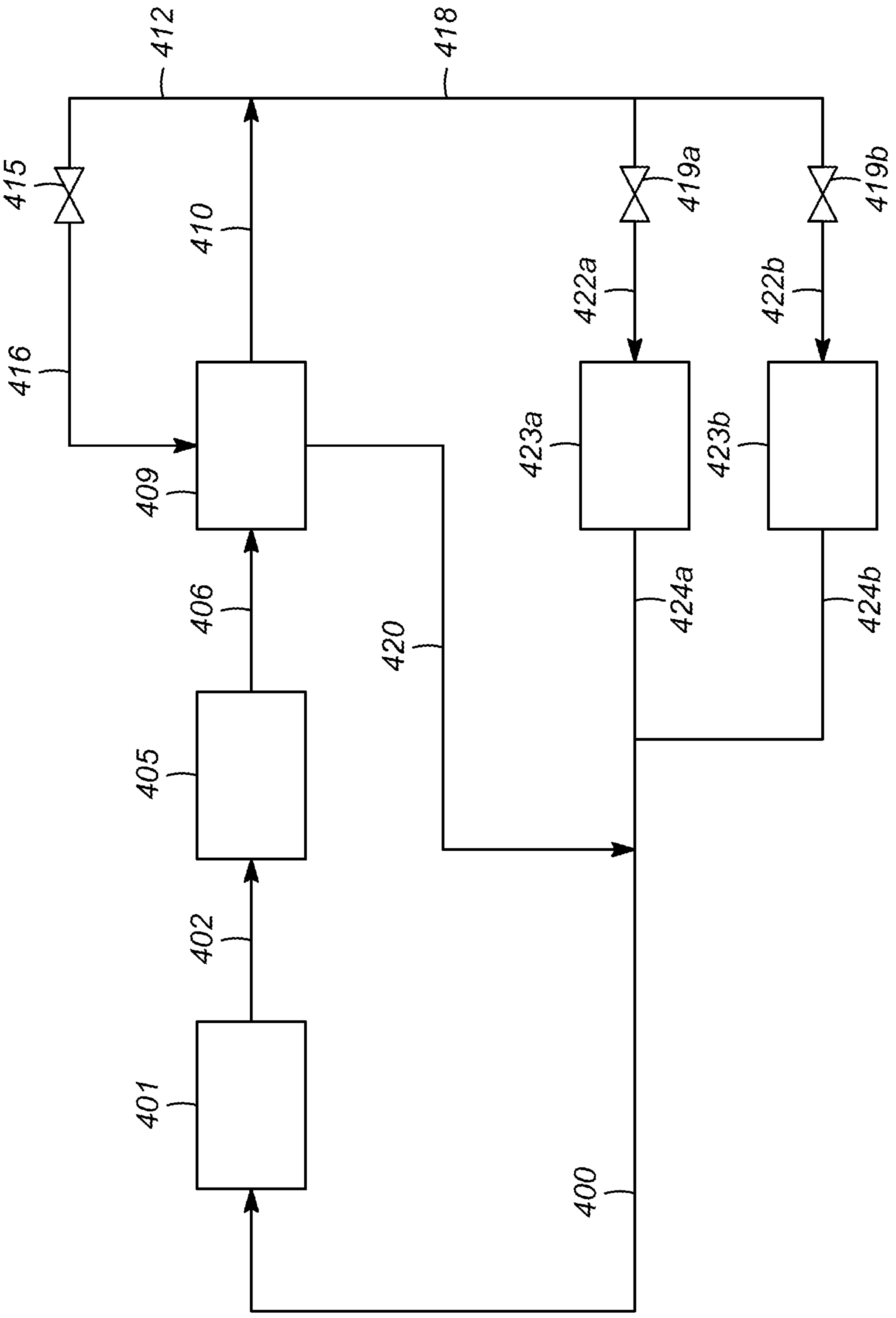
FIG. 3B is an illustration of one embodiment of a single stage heat pump with a parallel internal heat exchanger and parallel evaporators.

In the process illustrated in FIG. 3B, the evaporator 423 in FIG. 3A is replaced with parallel evaporators 423*a* and 423*b*.

Figure 4A:
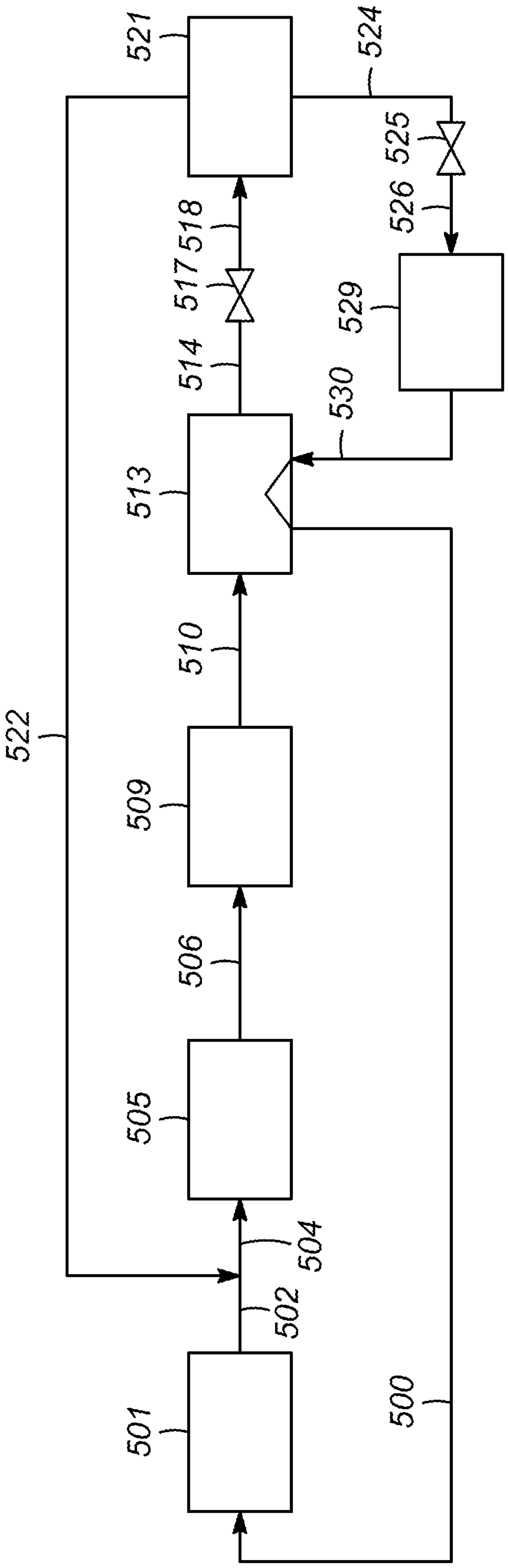
FIG. 4A is an illustration of one embodiment of a two-stage heat pump with a vapor/liquid separator and an internal heat exchanger.

FIG. 4A illustrates one embodiment of a two-stage heat pump described in this invention. The heated working fluid stream 500 is sent to a first compressor stage 501 forming an intermediate compressed stream 502. This intermediate compressed stream 502 is combined with vapor stream 522 from a vapor/liquid separator to form intermediate compressed stream 504. Intermediate compressed stream 504 is further compressed in a second compressor stage 505 forming compressed stream 506. The compressed working fluid stream 506 is sent to a condenser 509 followed by an internal heat exchanger 513 forming cooled working stream 514. Cooled working stream 514 is sent to pressure letdown device 517 then to vapor liquid separator 521 forming the vapor stream 522 and liquid stream 524. The liquid stream 524 is sent to a pressure letdown device 525 forming stream 526 followed by evaporator 529 then internal heat exchanger 513 reforming the heated working fluid stream 500.

Figure 4B:
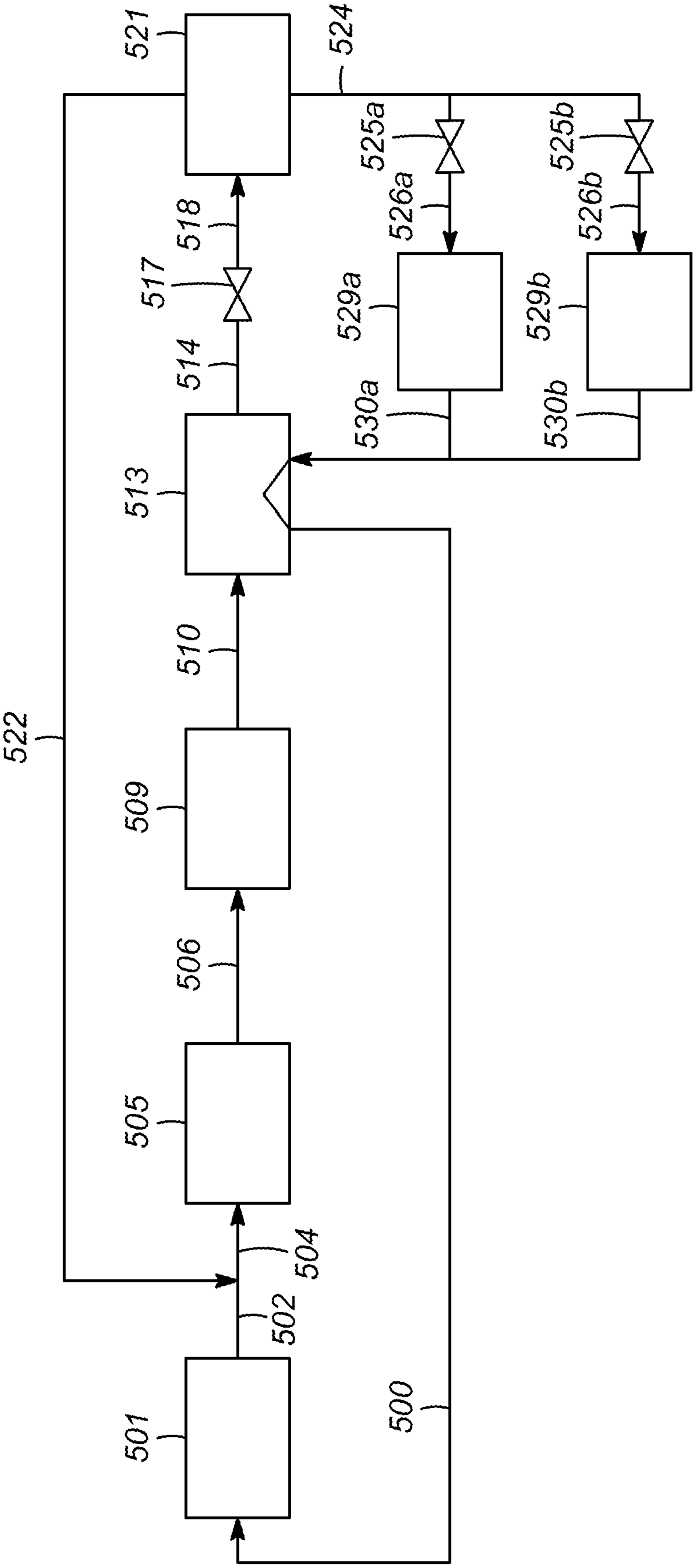
FIG. 4B is an illustration of one embodiment of a two-stage heat pump with a vapor/liquid separator, an internal heat exchanger, and parallel evaporators.

In the process illustrated in FIG. 4B, the evaporator 529 in FIG. 4A is replaced with parallel evaporators 529*a* and 529*b*.

Figure 5:
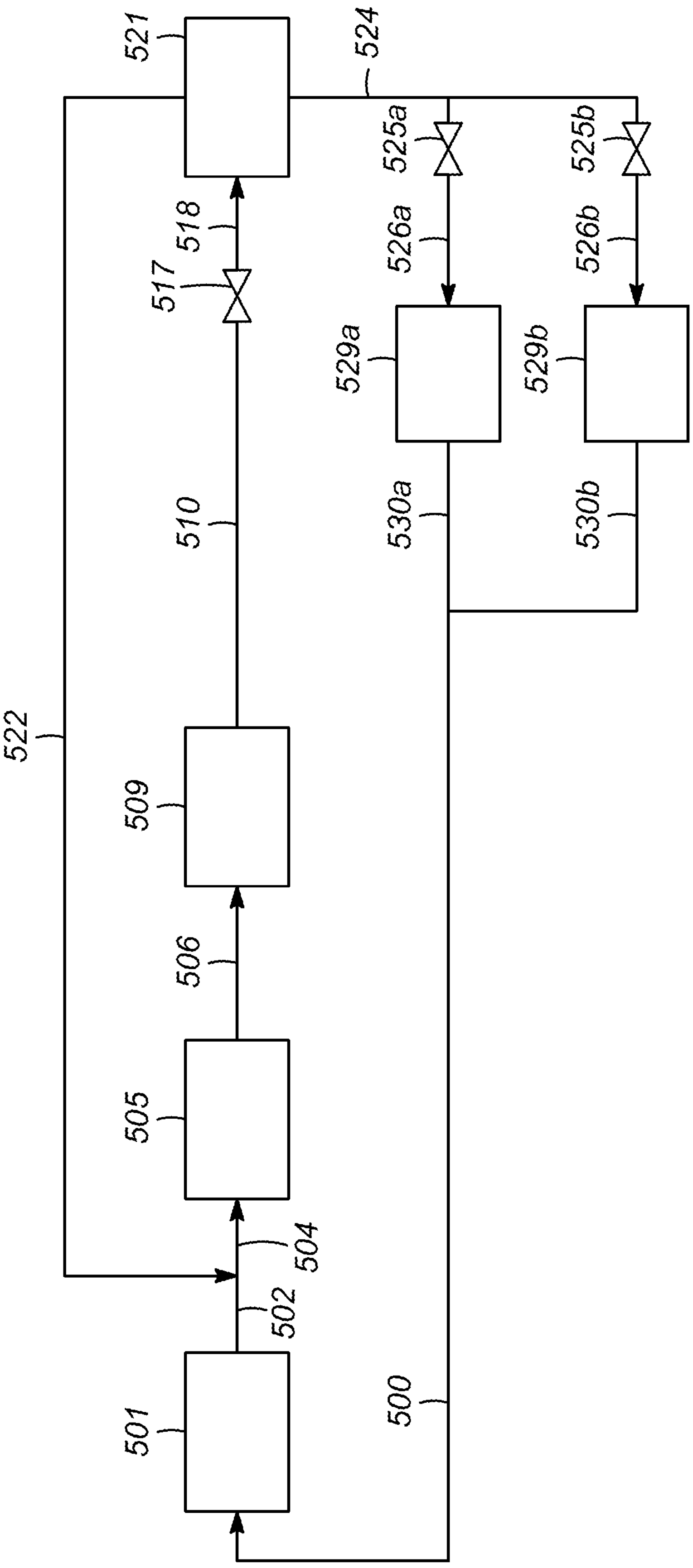
FIG. 5 is an illustration of one embodiment of a two-stage heat pump with a vapor/liquid separator and parallel evaporators.

FIG. 5 illustrates one embodiment of a two-stage heat pump described in this invention. This embodiment is identical to the two-stage heat pump process illustrated in FIG. 4*b*, but without internal heat exchanger 513. The compressed working fluid stream 506 is sent to a condenser 509 then to pressure letdown device 517 directly.

Figure 6:
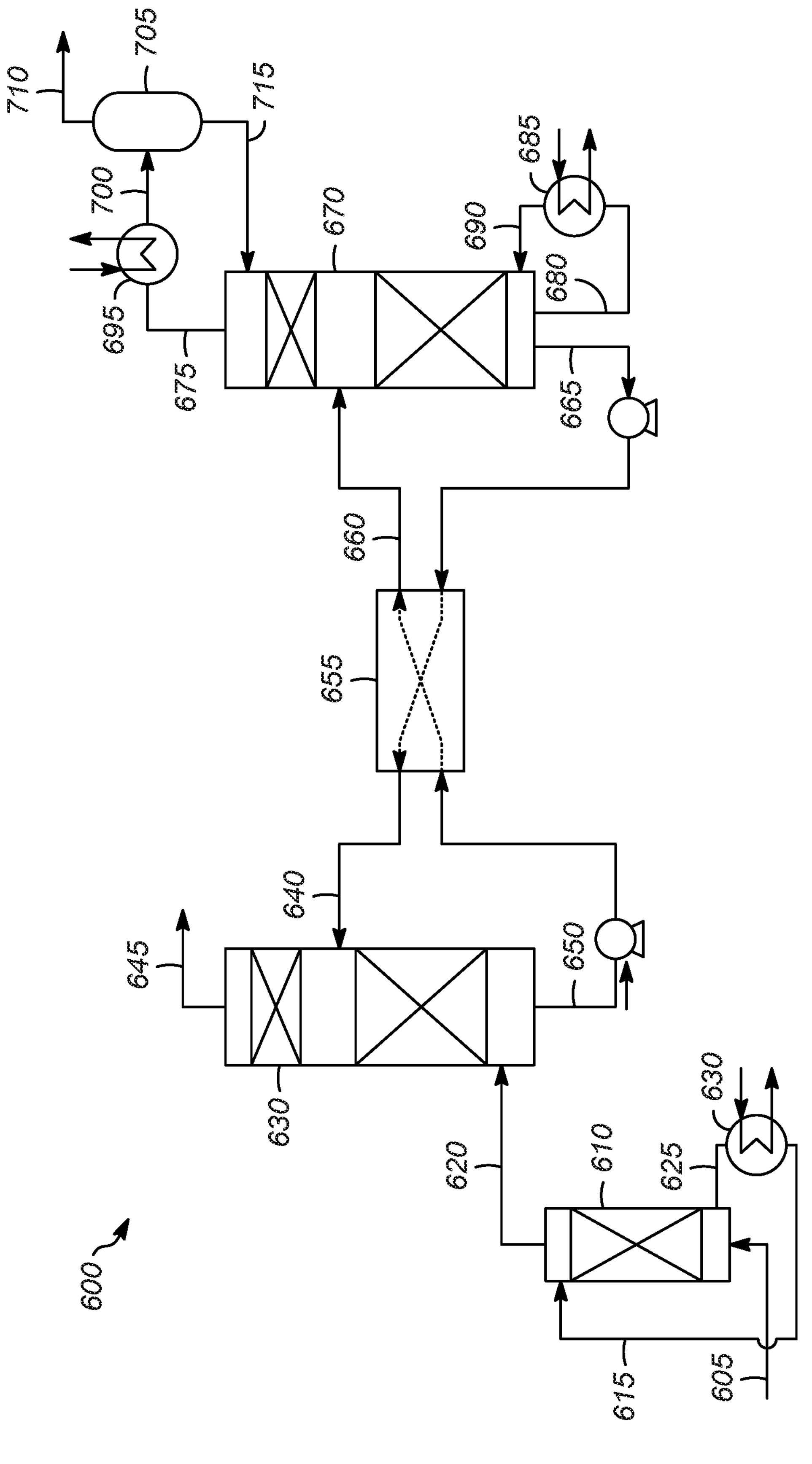
FIG. 6 (Prior Art)
FIG. 6 is an illustration of a $CO_2$ capture process using a typical simple stripping column.

FIG. 6 illustrates one embodiment of a $CO_2$ capture process using a typical simple stripping column.

The flue gas stream 605, which contains $CO_2$, is sent to a quench column 610 where it is contacted with a quench stream 615 forming a cooled flue gas stream 620 and a heated quench stream 625.

The heated quench stream 625 is sent to a feed quench cooler 630 to reduce the temperature and form the quench stream 615.

The cooled flue gas stream 620 is sent to the absorber column 630 where it contacts the lean solvent stream 640. The $CO_2$ is transferred from the flue gas to the lean solvent, forming a purified flue gas stream 645 and a rich solvent stream 650.

The rich solvent stream 650 is sent to a lean/rich heat exchanger 655 to exchange heat with a lean solvent stream 665 from the stripping column 670. The heated rich solvent stream 660 is sent to the stripping column 670, and the cooled lean solvent is sent to the absorption column 630.

The heated rich solvent stream 660 is separated into a $CO_2$ overhead stream 675 comprising the $CO_2$ and the lean solvent stream 665.

Reboiler solvent stream 680 is heated in stripping column reboiler 685, and the heated reboiler solvent stream 690 returned to the stripping column 670.

The overhead $CO_2$ stream 675 is cooled in $CO_2$ condenser 695, and the cooled overhead stream 700 is separated in $CO_2$ condenser receiver 705 into a purified $CO_2$ stream 710 and a liquid stream 715. The liquid stream 715 is refluxed to the stripping column 670.

Figure 7:
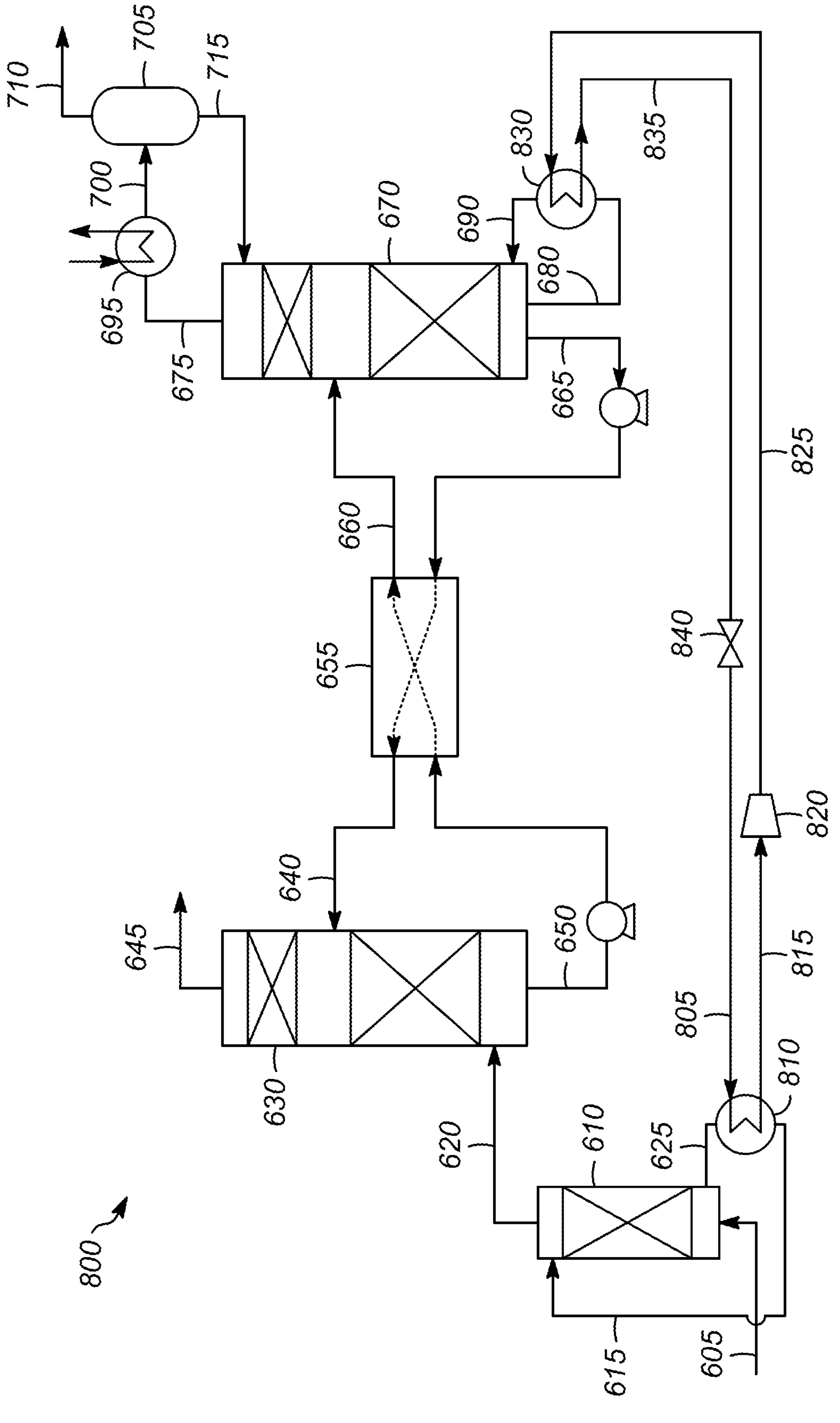
FIG. 7 is an illustration of a simple stripping process according to the present invention.

FIG. 7 illustrates a process 800 in which the feed quench cooler and the stripping column reboiler are replaced with a heat pump. The heated quench stream 625 contacts the working fluid stream 805 in the evaporator 810 forming a heated working fluid stream 815 and the quench stream 615. The heated working fluid stream 815 is compressed in heat pump compressor 820 forming compressed working fluid stream 825. The compressed working fluid stream 825 is contacted with the reboiler solvent stream 680 in the condenser 830 which heats the reboiler solvent stream 680 and cools the compressed working fluid stream 835. The cooled compressed working fluid stream 835 is expanded in the pressure let down device 840 reforming the working fluid stream 805.

EXAMPLES

Example 1

The $CO_2$ capture process of FIG. 1 was simulated using Aspen Plus® process modeling software using rate-based heat and mass transfer models for the absorber and stripping column and proprietary thermodynamic and kinetic models for an amine solvent for $CO_2$ absorption and stripping. Table 1 provides stream temperatures, stream heat capacity, and heat duties for the feed quench cooler 130, lean solvent cooler 210, overhead vapor condenser 225, and steam heat reboiler 205. For the steam heat reboiler 205, the temperature is the temperature of the heated rich solvent stream 150 exiting the steam heat reboiler 205, and there is no heat capacity because the stream undergoes a phase change in the steam heat reboiler. For the feed quench cooler 130, lean solvent cooler 210, and overhead vapor condenser 225, the temperature is the temperature of the hot process stream entering the exchanger.

TABLE 1

$CO_2$ Capture Process Heat Duties

| Heat Exchanger | Temperature ° C. | Heat Capacity GJ/° C. | Heat Duty GJ/h |
|---|---|---|---|
| Steam Heater Reboiler | 139 | — | 383 |
| Feed Quench Cooler | 59 | 12.2 | −206 |
| Lean Solvent Cooler | 55 | 10.3 | −90 |
| Overhead Vapor Condenser | 99 | 1.2 | −70 |

The one stage heat pump compressor cycle with parallel internal heat exchanger illustrated in FIG. 3B was simulated for this $CO_2$ capture process in Unisim® Design using 12.5 wt % n-butane/87.5 wt % isopentane as the working fluid. For this heat pump system, the steam heat reboiler 205 in FIG. 1 is replaced with the heat pump condenser 330 illustrated in FIG. 2. There is not enough heat in either the feed quench cooler 130 or lean solvent cooler 210 to provide the entire heat duty required for heat pump evaporator at a suitable approach temperature using a single waste heat source. Therefore, the heat pump evaporator 310 was split into two heat exchangers in parallel. The first evaporator heat exchanger replaces 120 GJ/h heat duty in the feed quench cooler, and the second evaporator heat exchanger replaces 90 GJ/h in the lean solvent cooler. The heat pump condenser has a log-mean temperature difference of 9° C., the feed quench cooler-heat pump evaporator has a log-mean temperature difference of 11° C., and the lean solvent cooler-heat pump evaporator has a log-mean temperature difference of 7.5° C. The heat pump compressor cycle delivers 383 GJ/h heat in the heat pump condenser 330 utilizing a combined total of 210 GJ/h process waste heat in the two heat pump evaporator exchangers 310 and 173 GJ/h compressor work, resulting in an overall coefficient of performance of 2.2. The stream properties for the one stage heat pump cycle are given in Table 2. Streams 422*a* and 424*a* correspond to the feed quench cooler-heat pump evaporator, and streams 422*b* and 424*b* correspond to the lean solvent cooler-heat pump evaporator.

TABLE 2

| n-Butane/Isopentane One Stage Heat Pump Stream Table | | | | | |
|---|---|---|---|---|---|
| | 400 | 402 | 406 | 410 | 416 |
| Temperature (° C.) | 85 | 163 | 139 | 61 | 43 |
| Pressure (kPa) | 172 | 2025 | 1955 | 1885 | 200 |
| Mass Flow (kg/h) | 1458000 | 1458000 | 1458000 | 1458000 | 729000 |
| Enthalpy (GJ/h) | −2961 | −2788 | −3171 | −3500 | −1750 |
| Entropy (kJ/kg-° C.) | −6.707 | −6.659 | −7.281 | −7.885 | −7.872 |
| | 420 | 422a | 424a | 422b | 424b |
| Temperature (° C.) | 125 | 43 | 41 | 43 | 41 |
| Pressure (kPa) | 172 | 200 | 172 | 200 | 172 |
| Mass Flow (kg/h) | 729000 | 415140 | 415140 | 313860 | 313860 |
| Enthalpy (GJ/h) | −1421 | −997 | −877 | −753 | −663 |
| Entropy (kJ/kg-° C.) | −6.490 | −7.872 | −6.951 | −7.872 | −6.951 |

Example 2

A second heat pump cycle was simulated for the $CO_2$ capture process described in Example 1 using the two-stage heat pump cycle with an internal heat exchanger illustrated in FIG. 4B using 12.5 wt % n-butane/87.5 wt % isopentane as the working fluid. For this heat pump system, the steam heat reboiler 205 in FIG. 1 is replaced with the heat pump condenser 330 illustrated in FIG. 2. There was not enough heat in either the feed quench cooler 130 or lean solvent cooler 210 to provide the entire heat duty required for heat pump evaporator at a suitable approach temperature using a single waste heat source. Therefore, the heat pump condenser 330 was split into two heat exchangers in parallel. The first evaporator heat exchanger replaces 132 GJ/h heat duty in the feed quench cooler, and the second evaporator heat exchanger replaces 90 GJ/h in the lean solvent cooler. The heat pump condenser has a log-mean temperature difference of 9° C., the feed quench cooler-heat pump evaporator has a log-mean temperature difference of 10° C., and the lean solvent cooler-heat pump evaporator has a log-mean temperature difference of 7.5° C. Compressor suction and discharge temperatures were adjusted to maintain similar heat exchanger approach temperatures as in Example 1 for fair comparison of the two heat pump performances. The n-butane/isopentane two-stage heat pump compressor cycle delivers 383 GJ/h heat in the heat pump condenser 330 utilizing a combined total of 222 GJ/h process waste heat in the two heat pump evaporator exchangers 310 and 161 GJ/h compressor work resulting in an overall coefficient of performance of 2.4. The stream properties for the two-stage heat pump cycle are given in Table 3. Streams 526*a* and 530*a* correspond to the feed quench cooler-heat pump evaporator, and streams 526*b* and 530*b* correspond to the lean solvent cooler-heat pump evaporator.

TABLE 3

| n-Butane/Isopentane Two-Stage Heat Pump Stream Table | | | | | | | |
|---|---|---|---|---|---|---|---|
| | 500 | 502 | 504 | 506 | 510 | 514 | 518 |
| Temperature (° C.) | 95 | 133 | 114 | 162 | 139 | 119 | 80 |
| Pressure (kPa) | 132 | 512 | 512 | 2025 | 1955 | 1885 | 519 |
| Mass Flow (kg/h) | 936886 | 936886 | 1480000 | 1480000 | 1480000 | 1480000 | 1480000 |
| Enthalpy (GJ/h) | −1882 | −1817 | −2932 | −2836 | −3220 | −3317 | −3317 |
| Entropy (kJ/kg-° C.) | −6.628 | −6.599 | −6.694 | −6.669 | −7.282 | −7.444 | −7.420 |
| | | 522 | 524 | 526a | 530a | 526b | 530b |
| Temperature (° C.) | | 80 | 80 | 44 | 41 | 44 | 41 |
| Pressure (kPa) | | 512 | 519 | 195 | 167 | 195 | 167 |
| Mass Flow (kg/h) | | 543114 | 936886 | 556307 | 556307 | 380579 | 380579 |
| Enthalpy (GJ/h) | | −1115 | −2202 | −1307 | −1175 | −894 | −804 |
| Entropy (kJ/kg-° C.) | | −6.872 | −7.738 | −7.720 | −6.958 | −7.720 | −6.958 |

Example 3

A third heat pump cycle was simulated for the $CO_2$ capture process described in Example 1 using the two-stage heat pump cycle without an internal heat exchanger illustrated in FIG. 5 using methyl formate as the working fluid. For this heat pump system, the steam heat reboiler 205 in FIG. 1 is replaced with the heat pump condenser 330 illustrated in FIG. 2. There was not enough heat in either the feed quench cooler 130 or lean solvent cooler 210 to provide the entire heat duty required for heat pump evaporator at a suitable approach temperature using a single waste heat source. Therefore, the heat pump condenser 330 was split into two heat exchangers in parallel. The first evaporator heat exchanger 529*a* replaces 160 GJ/h heat duty in the feed quench cooler, and the second evaporator heat exchanger 529*b* replaces 90 GJ/h in the lean solvent cooler. The heat pump condenser has a log-mean temperature difference of 9° C., the feed quench cooler-heat pump evaporator has a log-mean temperature difference of 9° C., and the lean solvent cooler-heat pump evaporator has a log-mean temperature difference of 7.5° C. Compressor suction and discharge temperatures were adjusted to maintain similar heat exchanger approach temperatures as in Example 1 for fair comparison of the two heat pump performances. The methyl formate two-stage heat pump compressor cycle delivers 383 GJ/h heat in the heat pump condenser 330 utilizing a combined total of 250 GJ/h process waste heat in the two heat pump evaporator exchangers 310 and 133 GJ/h compressor work resulting in an overall coefficient of performance of 2.9. The stream properties for the two-stage heat pump cycle are given in Table 4. Streams 526*a* and 530*a* correspond to the feed quench cooler-heat pump evaporator, and streams 526*b* and 530*b* correspond to the lean solvent cooler-heat pump evaporator.

TABLE 4

Methyl Formate Two-Stage Heat Pump Stream Table

| | 500 | 502 | 504 | 506 | 510 | 518 |
|---|---|---|---|---|---|---|
| Temperature (° C.) | 40 | 109 | 101 | 178 | 142 | 86 |
| Pressure (kPa) | 130 | 540 | 533 | 2100 | 2030 | 540 |
| Mass Flow (kg/h) | 679515 | 679515 | 1000000 | 1000000 | 1000000 | 1000000 |
| Enthalpy (GJ/h) | −3979 | −3927 | −5788 | −5707 | −6090 | −6090 |
| Entropy (kJ/kg-° C.) | −3.832 | −3.799 | −3.823 | −3.792 | −4.698 | −4.666 |
| | **522** | **524** | **526a** | **530a** | **526b** | **530b** |
| Temperature (° C.) | 86 | 86 | 45 | 40 | 45 | 40 |
| Pressure (kPa) | 540 | 540 | 165 | 137 | 165 | 137 |
| Mass Flow (kg/h) | 320485 | 320485 | 434099 | 434099 | 245416 | 245416 |
| Enthalpy (GJ/h) | −1861 | −4229 | −2701 | −2542 | −1527 | −1437 |
| Entropy (kJ/kg-° C.) | −3.883 | −5.035 | −5.018 | −3.839 | −5.018 | −3.839 |

stream from a flue gas economizer, or combinations thereof. An embodiment of the invention is one, any or all of prior embodiments in this paragraph up through the first embodiment in this paragraph wherein contacting a process stream having waste heat with the working fluid stream in the evaporator comprises contacting the flue gas stream with a quench stream in a quench column forming a cooled flue gas stream and a heated quench stream; and contacting the working fluid stream with the heated quench stream in the evaporator to form the quench stream. An embodiment of the invention is one, any or all of prior embodiments in this

Specific Embodiments

While the following is described in conjunction with specific embodiments, it will be understood that this description is intended to illustrate and not limit the scope of the preceding description and the appended claims.

A first embodiment of the invention is a process for $CO_2$ recovery from flue gas comprising providing a heat pump comprising an evaporator, a compressor, a condenser, a pressure letdown device, and a working fluid stream, the heat pump having a cycle comprising heating the working fluid stream in the evaporator, compressing the heated working fluid stream in the compressor, cooling the compressed stream in the condenser, and reducing the pressure of the cooled stream in the pressure letdown device; contacting a process stream having waste heat with the working fluid stream in the evaporator forming a cooled process stream and the heated working fluid stream; introducing a flue gas stream and a lean solvent stream into an absorber column forming a purified flue gas stream and a rich solvent stream comprising $CO_2$; contacting the rich solvent stream from the absorber or a second solvent stream comprising $CO_2$ from the stripping column or both with the compressed working fluid stream in the condenser of the heat pump forming a heated rich solvent stream or a heated second solvent stream or both and the cooled working fluid stream; and delivering the heated rich solvent stream or the heated second solvent stream or both to a stripping column below a lowest tray or section of packing in the stripping column and forming at least an overhead stream comprising $CO_2$ and the lean solvent stream. An embodiment of the invention is one, any or all of prior embodiments in this paragraph up through the first embodiment in this paragraph wherein the process stream comprises a stream from a feed quench cooler, a stream from an absorber cooler, a stream from a lean solvent cooler, a stream from an overhead vapor condenser, a stream from a $CO_2$ compressor intercooler, a paragraph up through the first embodiment in this paragraph further comprising preheating the rich solvent stream from the absorber column by heat exchange with the lean solvent stream before contacting the heated rich solvent stream with the compressed working fluid stream. An embodiment of the invention is one, any or all of prior embodiments in this paragraph up through the first embodiment in this paragraph further comprising a first flow path delivering at least some of the rich solvent from the absorber column to the stripping column at a point below the lowest tray or section of packing; a second flow path delivering the lean solvent from the stripping column to a point on the absorber column; at least a first heat exchanger and a second heat exchanger connecting the first flow path to the second flow path, the first and second heat exchangers permitting heat transfer between the rich solvent and the lean solvent; a cold rich solvent bypass connecting the first flow path at a location upstream of the first heat exchanger to a first point on the stripping column, wherein the cold rich solvent bypass directs a first portion of the rich solvent from the first flow path; a warm rich solvent bypass connecting the first flow path at a location downstream of the first heat exchanger to a second point on the stripping column, wherein the warm rich solvent bypass directs a second portion of the rich solvent from the first flow path. An embodiment of the invention is one, any or all of prior embodiments in this paragraph up through the first embodiment in this paragraph wherein the heat pump comprises a single stage heat pump, or a two-stage heat pump. An embodiment of the invention is one, any or all of prior embodiments in this paragraph up through the first embodiment in this paragraph wherein the heat pump comprises a single stage heat pump with an internal heat exchanger, wherein the internal heat exchanger is located in parallel to the evaporator. An embodiment of the invention is one, any or all of prior embodiments in this paragraph up through the first embodiment in this paragraph wherein the heat pump comprises a two-stage heat pump with an internal heat exchanger. An embodiment of the invention is one, any or all of prior embodiments in this paragraph up through the first embodiment in this paragraph wherein the heat pump comprises a two-stage heat pump with a vapor/liquid separator in which the vapor is mixed with the first stage compressor effluent and directed to the second stage compressor suction. An embodiment of the invention is one, any or all of prior embodiments in this paragraph up through the first embodiment in this paragraph wherein the heat pump comprises a two-stage heat pump with a vapor/liquid separator in which a portion of the liquid is vaporized in a heat exchanger, combined with vapor from the first stage compressor effluent, and directed to the second stage compressor suction. An embodiment of the invention is one, any or all of prior embodiments in this paragraph up through the first embodiment in this paragraph wherein the working fluid comprises a fluid having a critical temperature of 150° C. or greater and a normal boiling point of 50° C. or less at 100 kPa. An embodiment of the invention is one, any or all of prior embodiments in this paragraph up through the first embodiment in this paragraph wherein the working fluid comprises a fluid having a critical temperature of 160° C. or greater and a normal boiling point of 40° C. or less at 100 kPa. An embodiment of the invention is one, any or all of prior embodiments in this paragraph up through the first embodiment in this paragraph wherein the working fluid comprises a chlorofluorocarbon, a hydrochlorofluorcarbon, a hydrofluorocarbon, a hydrofluoroolefin, a hydrochlorofluoroolefin, a hydrocarbon, an oxygenate, or combinations thereof. An embodiment of the invention is one, any or all of prior embodiments in this paragraph up through the first embodiment in this paragraph wherein the working fluid comprises trans-1-chloro-3,3,3-trifluoropropene, cis-1-chloro-3,3,3-trifluoropropene, trans-1-chloro-2,3,3,3-tetrafluoropropene, cis-1,1,1,4,4,4-hexafluoro-2-butene, a hydrochlorofluoroolefin having 3 carbon atoms, a hydrofluoroolefin having 4 carbon atoms, or combinations thereof. An embodiment of the invention is one, any or all of prior embodiments in this paragraph up through the first embodiment in this paragraph wherein the working fluid comprises n-butane, isobutane, n-pentane, isopentane, neopentane, cyclohexane, or combinations thereof. An embodiment of the invention is one, any or all of prior embodiments in this paragraph up through the first embodiment in this paragraph wherein the working fluid comprises diethyl ether, methyl formate, ethylamine, or combinations thereof. An embodiment of the invention is one, any or all of prior embodiments in this paragraph up through the first embodiment in this paragraph wherein the pressure letdown device comprises a valve, a turbine, or combinations thereof. An embodiment of the invention is one, any or all of prior embodiments in this paragraph up through the first embodiment in this paragraph wherein the evaporator comprises at least two heat exchangers in parallel; contacting a process stream having waste heat with the working fluid stream in a first evaporator heat exchanger forming a cooled process stream and a first heated working fluid stream; contacting the working fluid with a heating medium in a second evaporator heat exchanger forming a second heated working fluid stream; and combining the first and second heated working fluid streams.

A second embodiment of the invention is a process for $CO_2$ recovery from flue gas comprising providing a heat pump comprising an evaporator, a compressor, a condenser, a pressure letdown device, and a working fluid stream, the heat pump having a cycle comprising heating the working fluid stream in the evaporator, compressing the heated working fluid stream in the compressor, cooling the compressed stream in the condenser, and reducing the pressure of the cooled stream in the pressure letdown device, and wherein the heat pump comprises a single stage heat pump, or a two-stage heat pump; contacting a process stream having waste heat with the working fluid stream in the evaporator forming a cooled process stream and the heated working fluid stream, wherein the process stream comprises a stream from a feed quench cooler, a stream from an absorber cooler, a stream from a lean solvent cooler, a stream from an overhead vapor condenser, a stream from a $CO_2$ compressor intercooler, a stream from a flue gas economizer, or combinations thereof; introducing a flue gas stream and a lean solvent stream into an absorber column forming a purified flue gas stream and a rich solvent stream comprising $CO_2$; contacting the rich solvent stream from the absorber or a second solvent stream comprising $CO_2$ from the stripping column or both with the compressed working fluid stream in the condenser of the heat pump forming a heated rich solvent stream or a heated second solvent stream or both and the cooled working fluid stream; and delivering the heated rich solvent stream or the heated second solvent stream or both to a stripping column below a lowest tray or section of packing in the stripping column and forming at least an overhead stream comprising $CO_2$ and the lean solvent stream. An embodiment of the invention is one, any or all of prior embodiments in this paragraph up through the second embodiment in this paragraph further comprising a first flow path delivering at least some of the rich solvent from the absorber column to the stripping column at a point below the lowest tray or section of packing; a second flow path delivering the lean solvent from the stripping column to a point on the absorber column; at least a first heat exchanger and a second heat exchanger connecting the first flow path to the second flow path, the first and second heat exchangers permitting heat transfer between the rich solvent and the lean solvent; a cold rich solvent bypass connecting the first flow path at a location upstream of the first heat exchanger to a first point on the stripping column, wherein the cold rich solvent bypass directs a first portion of the rich solvent from the first flow path; a warm rich solvent bypass connecting the first flow path at a location downstream of the first heat exchanger to a second point on the stripping column, wherein the warm rich solvent bypass directs a second portion of the rich solvent from the first flow path. An embodiment of the invention is one, any or all of prior embodiments in this paragraph up through the second embodiment in this paragraph wherein the working fluid comprises trans-1-chloro-3,3,3-trifluoropropene, cis-1-chloro-3,3,3-trifluoropropene, trans-1-chloro-2,3,3,3-tetrafluoropropene, cis-1,1,1,4,4,4-hexafluoro-2-butene, a hydrochlorofluoroolefin having 3 carbon atoms, a hydrofluoroolefin having 4 carbon atoms, n-butane, isobutane, n-pentane, isopentane, neopentane, cyclohexane, diethyl ether, methyl formate, ethylamine, or combinations thereof.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

What is claimed is:

1. A process for $CO_2$ recovery from flue gas comprising:

providing a heat pump comprising an evaporator, a compressor, a condenser, a pressure letdown device, and a working fluid stream, the heat pump having a cycle comprising heating the working fluid stream in the evaporator, compressing the heated working fluid stream in the compressor, cooling the compressed stream in the condenser, and reducing the pressure of the cooled stream in the pressure letdown device;

contacting a process stream having waste heat with the working fluid stream in the evaporator forming a cooled process stream and the heated working fluid stream;

introducing a flue gas stream and a lean solvent stream into an absorber column forming a purified flue gas stream and a rich solvent stream comprising $CO_2$;

contacting the rich solvent stream from the absorber or a second solvent stream comprising $CO_2$ from a stripping column or both with the compressed working fluid stream in the condenser of the heat pump forming a heated rich solvent stream or a heated second solvent stream or both and the cooled working fluid stream; and delivering the heated rich solvent stream or the heated second solvent stream or both to the stripping column below a lowest tray or section of packing in the stripping column and forming at least an overhead stream comprising $CO_2$ and the lean solvent stream, wherein the heat pump comprises a two-stage heat pump with a vapor/liquid separator in which the vapor is mixed with the first stage compressor effluent and directed to the second stage compressor suction.

2. The process of claim 1 wherein the process stream comprises a stream from a feed quench cooler, a stream from an absorber cooler, a stream from a lean solvent cooler, a stream from an overhead vapor condenser, a stream from a $CO_2$ compressor intercooler, a stream from a flue gas economizer, or combinations thereof.

3. The process of claim 1 wherein contacting a process stream having waste heat with the working fluid stream in the evaporator comprises:

contacting the flue gas stream with a quench stream in a quench column forming a cooled flue gas stream and a heated quench stream; and contacting the working fluid stream with the heated quench stream in the evaporator to form the quench stream.

4. The process of claim 1 further comprising:

preheating the rich solvent stream from the absorber column by heat exchange with the lean solvent stream before contacting the heated rich solvent stream with the compressed working fluid stream.

5. The process of claim 1 further comprising:

a first flow path delivering at least some of the rich solvent from the absorber column to the stripping column at a point below the lowest tray or section of packing;

a second flow path delivering the lean solvent from the stripping column to a point on the absorber column;

at least a first heat exchanger and a second heat exchanger connecting the first flow path to the second flow path, the first and second heat exchangers permitting heat transfer between the rich solvent and the lean solvent;

a cold rich solvent bypass connecting the first flow path at a location upstream of the first heat exchanger to a first point on the stripping column, wherein the cold rich solvent bypass directs a first portion of the rich solvent from the first flow path;

a warm rich solvent bypass connecting the first flow path at a location downstream of the first heat exchanger to a second point on the stripping column, wherein the warm rich solvent bypass directs a second portion of the rich solvent from the first flow path.

6. The process of claim 1 wherein the heat pump comprises an internal heat exchanger.

7. The process of claim 1 wherein a portion of the liquid is vaporized in a heat exchanger, combined with vapor from the first stage compressor effluent, and directed to the second stage compressor suction.

8. The process of claim 1 wherein the working fluid comprises a fluid having a critical temperature of 150° C. or greater and a normal boiling point of 50° C. or less at 100 kPa.

9. The process of claim 1 wherein the working fluid comprises a fluid having a critical temperature of 160° C. or greater and a normal boiling point of 40° C. or less at 100 kPa.

10. The process of claim 1 wherein the working fluid comprises a chlorofluorocarbon, a hydrochlorofluorcarbon, a hydrofluorocarbon, a hydrofluoroolefin, a hydrochlorofluoroolefin, a hydrocarbon, an oxygenate, or combinations thereof.

11. The process of claim 1 wherein the working fluid comprises trans-1-chloro-3,3,3-trifluoropropene, cis-1-chloro-3,3,3-trifluoropropene, trans-1-chloro-2,3,3,3-tetrafluoropropene, cis-1,1,1,4,4,4-hexafluoro-2-butene, a hydrochlorofluoroolefin having 3 carbon atoms, a hydrofluoroolefin having 4 carbon atoms, or combinations thereof.

12. The process of claim 1 wherein the working fluid comprises n-butane, isobutane, n-pentane, isopentane, neopentane, cyclohexane, or combinations thereof.

13. The process of claim 1 wherein the working fluid comprises diethyl ether, methyl formate, ethylamine, or combinations thereof.

14. The process of claim 1 wherein the pressure letdown device comprises a valve, a turbine, or combinations thereof.

15. The process of claim 1 wherein the evaporator comprises at least two heat exchangers in parallel;

contacting a process stream having waste heat with the working fluid stream in a first evaporator heat exchanger forming a cooled process stream and a first heated working fluid stream;

contacting the working fluid with a heating medium in a second evaporator heat exchanger forming a second heated working fluid stream; and combining the first and second heated working fluid streams.

16. A process for $CO_2$ recovery from flue gas comprising:

providing a heat pump comprising an evaporator, a compressor, a condenser, a pressure letdown device, and a working fluid stream, the heat pump having a cycle comprising heating the working fluid stream in the evaporator, compressing the heated working fluid stream in the compressor, cooling the compressed stream in the condenser, and reducing the pressure of the cooled stream in the pressure letdown device, and wherein the heat pump comprises a single stage heat pump, or a two-stage heat pump;

contacting a process stream having waste heat with the working fluid stream in the evaporator forming a cooled process stream and the heated working fluid stream, wherein the process stream comprises a stream from a feed quench cooler, a stream from an absorber cooler, a stream from a lean solvent cooler, a stream from an overhead vapor condenser, a stream from a $CO_2$ compressor intercooler, a stream from a flue gas economizer, or combinations thereof;

introducing a flue gas stream and a lean solvent stream into an absorber column forming a purified flue gas stream and a rich solvent stream comprising $CO_2$;

contacting the rich solvent stream from the absorber or a second solvent stream comprising $CO_2$ from a stripping column or both with the compressed working fluid stream in the condenser of the heat pump forming a heated rich solvent stream or a heated second solvent stream or both and the cooled working fluid stream; and delivering the heated rich solvent stream or the heated second solvent stream or both to the stripping column below a lowest tray or section of packing in the stripping column and forming at least an overhead stream comprising $CO_2$ and the lean solvent stream, a first flow path delivering at least some of the rich solvent from the absorber column to the stripping column at a point below the lowest tray or section of packing;

a second flow path delivering the lean solvent from the stripping column to a point on the absorber column;

at least a first heat exchanger and a second heat exchanger connecting the first flow path to the second flow path, the first and second heat exchangers permitting heat transfer between the rich solvent and the lean solvent;

a cold rich solvent bypass connecting the first flow path at a location upstream of the first heat exchanger to a first point on the stripping column, wherein the cold rich solvent bypass directs a first portion of the rich solvent from the first flow path; and a warm rich solvent bypass connecting the first flow path at a location downstream of the first heat exchanger to a second point on the stripping column, wherein the warm rich solvent bypass directs a second portion of the rich solvent from the first flow path.

* * * * *